Nov. 24, 1942.   W. Y. LANG   2,303,054
POLAR SIGNAL TEST TRANSMITTER
Filed Aug. 6, 1941    3 Sheets-Sheet 1

FIG. 1

INVENTOR
W. Y. LANG
BY J. W. Schmied
ATTORNEY

Nov. 24, 1942.  W. Y. LANG  2,303,054

POLAR SIGNAL TEST TRANSMITTER

Filed Aug. 6, 1941  3 Sheets-Sheet 2

FIG. 2

INVENTOR
W. Y. LANG
BY
J. W. Schmied
ATTORNEY

Patented Nov. 24, 1942

2,303,054

UNITED STATES PATENT OFFICE 2,303,054

POLAR SIGNAL TEST TRANSMITTER

Wilmarth Y. Lang, Towaco, N. J., assignor to Bell Telephone Laboratories, Incorporated, New York, N. Y., a corporation of New York Application August 6, 1941, Serial No. 405,579

11 Claims. (Cl. 178—69)

This invention relates to telegraph transmitters and particularly to transmitters for generating polar signals. More specifically, the invention relates to telegraph transmitters for generating and transmitting polar signals intentionally subjected to various types of distortion for testing purposes.

Heretofore it has sometimes been the practice to generate polar telegraph signals by impressing upon the segments of a rotary brush and conductive ring type of distributor, combinations of potentials of one polarity to control a relay interposed between the distributor and the telegraph line, the armature of the relay being connected to the line and being operable between two contacts to which sources of potential of opposite polarity are connected. With such an arrangement the rotary distributor generates telegraph signals comprising combinations of potentials at one polarity which control the relay to impress upon the telegraph line by means of its armature combinations of impulses of two polarities. Polar signals so generated are usually quite satisfactory for ordinary telegraph system operation but may be unsatisfactory for generating signals artificially and intentionally subjected to predetermined types and magnitudes of distortion to be employed in testing telegraph receiving equipment. The reason for this is that a relay interposed between a rotary distributor and a telegraph line or telegraph receiving device for converting non-polar signals into polar signals may have inherent characteristics which cause the signals generated to be subjected to further distortion which may have additive or subtractive effect upon the known distortion intentionally imparted to the signals as generated. Although the kind and magnitude of distortion introduced by the relay might be determined prior to the use of the relay in generating polar signals, the results of tests with such signals could not be obtained by direct observation of signal responsive apparatus but would have to be modified by mathematical processes to eliminate the factors contributed by the relay in order to obtain absolute indications of the response of the apparatus under test to the intentionally distorted signals.

Accordingly, it is an object of the invention to provide a distorted polar signal telegraph transmitter in which the polar signals are generated directly upon the conductive rings of a brush and ring rotary transmitter and are impressed directly upon a signaling circuit by the rotary transmitter.

Another object of the invention is to subject telegraph signals to distortion in the generation thereof by electrical shifting of the arcs of the conductive rings of the distributor pertaining to the several impulses of a telegraph signal.

In accordance with the preferred embodiment of the invention, a signal storage tape having miscellaneous matter telegraph signals perforated therein by means of a signal storing perforator, such as a keyboard perforator, is used to control the transmitting contacts of a tape sensing mechanism. The contacts of the tape sensing mechanism are connected to the windings of relays which have armatures operable between sources of potential of opposite polarities and other armatures for performing certain circuit switching operations. A rotary brush type telegraph signal transmitter, the brush arm of which is driven continuously when a supply of signal storage tape is placed in the tape sensing mechanism, has a continuous conductive ring which is connected by a conductive path to a telegraph receiving device to be tested and also has a segmented conductive ring. The code impulse arcs of the segmented ring consist of an equal number of segments which in the particular embodiment of the invention are shown as being of equal length, but need not be of equal length as is hereinafter set forth, which are insulated from each other and there may be five or six such arcs, depending upon whether the signals to be transmitted are five-unit or six-unit permutation code signals. The transmitter is arranged to generate start-stop signals and the start and stop impulse arcs each consist of two segments. One segment of each of the start and s top impulse arcs is equal in length to the segments of the code impulse arcs, those segments of the start and stop impulse arcs being immediately preceding the first segment of the first code impulse arc or group of segments and immediately following the last segment of the last code impulse arc or group of segments, respectively. One segment of each of the code impulse arcs or groups is arranged to receive signaling impulse generating potentials of either of two polarities directly and solely under control of the relays which are controlled by the tape sensing contacts. The other segments of the code impulse groups are arranged to receive signaling impulse generating potentials under the joint control of the relays and any one of several individually and selectively operable switching devices by means of which the polarities of the potentials applied to the other segments of each signaling impulse group may be varied to provide combinations of polarities which comprise distorted signals.

As is well known telegraph signals may be affected by three general types of distortion, namely, bias characteristic distortion and fortuitous distortion. To check the capabilities of a telegraph signal receiving mechanism such as a teletypewriter or similar apparatus it has been found desirable to transmit to the receiving mechanism in question two types of distortion, namely, bias and end distortion.

These two types of distortion may either increase the length of marking impulses or decrease the length of marking impulses, an increase in length being referred to as marking distortion and a decrease in length being referred to as spacing distortion.

Bias in a signal affects the relationship between the beginning of the start impulse immediately preceding a signal train and the beginning of all subsequent marking pulses of the signal train. Thus a marking bias decreases the time from the beginning of the start impulse to the beginning of any subsequent marking impulse of the signal train and a spacing bias increases the time from the beginning of the start impulse to the beginning of any marking impulse in the signal train, the standard of comparison for determining whether a decrease or increase in the interval between the beginning of the start impulse and the beginning of any subsequent marking impulse has occurred being the interval between the beginning of the start impulse and the beginning of a corresponding marking impulse of a signal train having zero bias.

End distortion which is sent by a test distributor is actually a synthetic type of distortion but its effect on a teletypewriter or similar receiving mechanism is similar to that of characteristic distortion plus to a slight degree fortuitous distortion. Receiving mechanisms which are adjusted to tolerate end distortion will also tolerate either characteristic or fortuitous distortion of approximately the same magnitude.

End distortion differs from bias in that its effect is noted as a change in relationship between the beginning of the start pulse and the end of succeeding marking selecting pulses and in the case of end distortion, the stop impulse is not affected. A marking end distortion increases the time from the beginning of the start impulse to the end of any marking selecting impulse of a signal train and a spacing end distortion decreases the time from the beginning of the start impulse to the end of any marking selecting impulse of the signal train. The standard of comparison for determining whether a decrease or increase in the interval between the beginning of the start impulse and the end of a marking selecting impulse has occurred is the interval between the beginning of the start impulse and the end of a corresponding marking selecting impulse of a signal train having zero end distortion.

Specifically, a signal receiving device interprets marking bias as a shortening of the interval between the beginning of the start impulse and the beginning of a marking impulse and such bias is therefore characterized by lengthening of a marking impulse accompanied by a corresponding shortening of a spacing impulse immediately preceding it. Spacing bias is interpreted as a lengthening of the interval between the beginning of the start impulse and the beginning of a marking impulse and is characterized by shortening of a marking impulse accompanied by a corresponding lengthening of a spacing signal immediately preceding it. Marking end distortion is interpreted by a signal receiver as a lengthening of the interval between the beginning of the start impulse and the end of a marking impulse and is characterized by lengthening of a marking impulse accompanied by a corresponding shortening of the spacing impulse immediately following it. Spacing end distortion is interpreted as a shortening of the interval between the beginning of the start impulse and the end of a marking impulse and is characterized by shortening of a marking impulse accompanied by a corresponding lengthening of the spacing impulse immediately following it.

It should also be noted that whereas a bias condition affects the stop impulse in the same manner as it does marking selecting impulses, advancing or delaying its beginning relative to the beginning of the start signal, an end distortion condition does not advance or delay the end of the stop impulse. The reason for this is that the end of a stop impulse coincides with the beginning of a start impulse which is the point of reference from which bias or end distortion conditions are interpreted by a signal receiving device such as a telegraph printer. It follows from this that when biased signals are of such type that a receiving device can accurately interpret the beginning of the first significant impulse and the beginning of the stop impulse, as when the first significant impulse is of marking nature and the last significant impulse is of spacing nature, a marking bias will cause shortening of the start impulse and lengthening of the stop impulse and spacing bias will cause lengthening of the start impulse and shortening of the stop impulse, whereas when signals are affected by end distortion the start and stop impulses will be unaffected and will be of standard length.

For a complete understanding of the invention, reference may be had to the following detailed description to be interpreted in the light of the accompanying drawings in which.

Figure 1:
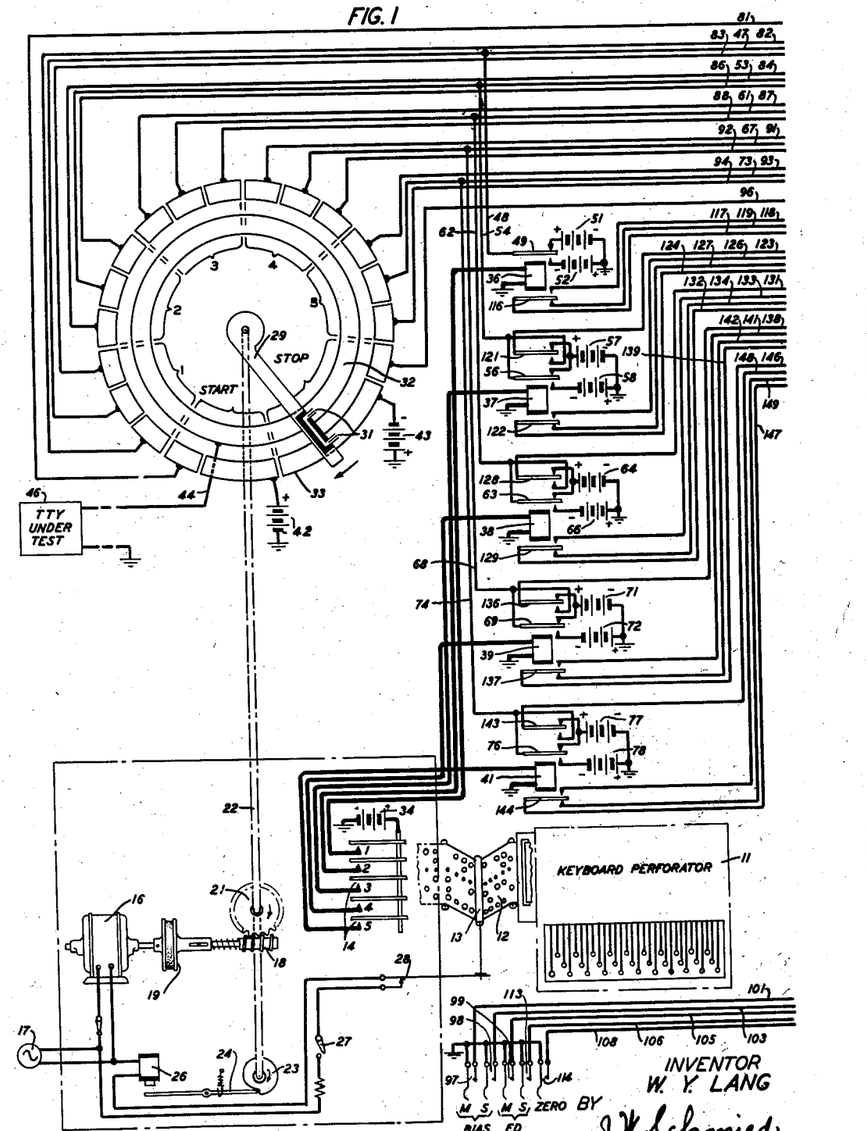
Figs. 1, 2 and 3 are schematic electrical circuit diagrams of portions of the signal transmitter, according to the present invention, and the three figures when placed side by side in numerical order from left to right show the complete transmitter.

Referring now to the drawings, and particularly to Fig. 1, the reference numeral 11 indicates in diagrammatic form a keyboard controlled tape perforator which may be of the type shown in Patent 1,182,179 granted May 9, 1916, to C. L. Krum, et al., and the disclosure of that patent is incorporated herein by reference as a part of the present specification. The perforator 11 is adapted to perforate signal storage tape 12 which passes beneath a tape tension responsive bar 13 and enters a tape sensing mechanism indicated schematically by the tape sensing contacts 14. A tape sensing mechanism of the type here contemplated is fully disclosed in Patent 2,055,567 granted September 29, 1936, to E. F. Watson. The disclosure of the Watson patent is incorporated herein by reference as a part of the present specification.

A motor 16 which is connected to a source of power 17 drives a worm gear 18 through a friction clutch 19. The worm gear 18 meshes with and drives a worm wheel 21 secured to a distributor shaft 22. Shaft 22 has secured thereto a start cam 23 which is held stationary in the idle condition of the apparatus by spring biased armature lever 24 of a start magnet 26. Magnet 26 receives energizing current from source 17 through manually operable switch 27 and contacts 28 controlled by tape tension bar 13. When tape 12 has been placed in the tape sensing mechanism in position to have the code perforations therein sensed, and there is a sufficient supply of tape between the tape sensing mechanism and the perforator 11 to provide a loop of tape, the tape tension bar 13 holds contacts 28 closed and upon the closure of manually operable switch 27, magnet 26 will be energized to retract armature lever 24 from blocking relation to start cam 23 whereby shaft 22 will be permitted to rotate under power supplied through friction clutch 19. Shaft 22 carries at its upper end a distributor brush arm 29 which carries electrically interconnected brushes 31 engaging the surfaces of continuous conductive ring 32 and segmented conductive ring indicated generally by the reference numeral 33.

There are five sets of transmitting contacts 14, since the apparatus shown herein is adapted to transmit five-unit permutation code signals, and one side of each of the five sets of contacts is connected to grounded battery 34. The other side of each set of contacts 14 is connected to one terminal of the winding of a relay, of which there are five, designated 36, 37, 38, 39 and 41, and the other terminal of each relay is connected to ground. As the code combinations of perforations in the signal storage tape 12 are sensed successively the set of contacts 14 will be closed in combinations corresponding to the code combinations of perforations and will complete the energizing circuits of corresponding ones of the relays 36, 37, 38, 39 and 41.

As shown in Fig. 1 the segments of segmented ring 33 of the distributor are arranged in seven arcuate groups identified "start," 1, 2, 3, 4, 5 and "stop." Each of the numbered arcuate groups consists of three segments of equal length and the "start" and "stop" groups consist of two segments. The segment of the "start" group which immediately precedes the segments of the code impulse group 1 is equal in length to the segments in the several code impulse groups and the other segment of the "start" group completes the angle allotted to the start impulse. The segment of the "stop" group which immediately follows the last segment of the code impulse group 5 is equal in length to the segments in the code impulse groups and the other segment of the "stop" group completes the angle allotted to the stop impulse which, as frequently employed in telegraph practice, is larger by an appreciable amount than the angle allotted to the start impulse. The longer of the two segments of the "start" group is connected to the positive terminal of grounded battery 42, since in polar telegraph transmission the spacing condition is positive, and the longer of the two segments of the "stop" group is connected to the negative terminal of grounded battery 43 since the marking condition is usually negative. The continuous conductive ring 32 is connected to one end of the signaling conductor 44 the other end of which is connected to one terminal of the telegraph receiving device 46 to be tested. The other terminal of the receiving device 46, which may be a receiving relay of a receiving telegraph printer, reperforator, regenerative repeater, or a polar magnet selector, is connected to ground. It will be apparent from this that when the transmitter is in the rest or idle condition, which is that shown in Fig. 1, negative or marking current will be supplied to the receiving device 46 from battery 43 through the long segment of the "stop" group, brushes 31, continuous conductive ring 32, signaling conductor 44 and receiving device 46 to ground.

The middle segment of the code impulse segment group 1, is connected by conductors 47 and 48 to armature 49 of relay 36 which normally engages a back contact to which positive or spacing grounded battery 51 is connected. The front contact with which armature 49 is engageable when relay 36 is energized under the control of one of the sets of contacts 14 is connected to negative or marking grounded battery 52. Similarly, the middle segment of group 2 is connected by conductors 53 and 54 to armature 56 of relay 37 which is operable between back and front contacts connected to positive or spacing and negative or marking batteries 57 and 58 respectively, the middle segment of group 3 is connected by conductors 61 and 62 to armature 63 of relay 38 which is operable between back and front contacts connected to grounded spacing battery 64 and grounded marking battery 66 respectively, the middle segment of group 4 is connected by conductors 67 and 68 to armature 69 of relay 39 which is operable between back and front contacts connected to grounded spacing battery 71 and grounded marking battery 72 respectively, and the middle segment of group 5 is connected by conductors 73 and 74 to armature 76 of relay 41 which is operable between back and front contacts connected to grounded spacing battery 77 and grounded marking battery 78 respectively. From the foregoing it will be observed that when any one of the relays 36, 37, 38, 39 or 41 is in spacing condition, which is the deenergized condition, its armature 49, 56, 63, 69 or 76 respectively, will connect spacing battery to the middle segment of the corresponding group of code impulse segments of the distributor and that when one of those relays is in marking or energized condition its associated armature will connect marking battery to the middle segment of the corresponding group of code impulse segments of the distributor.

Figure 2:
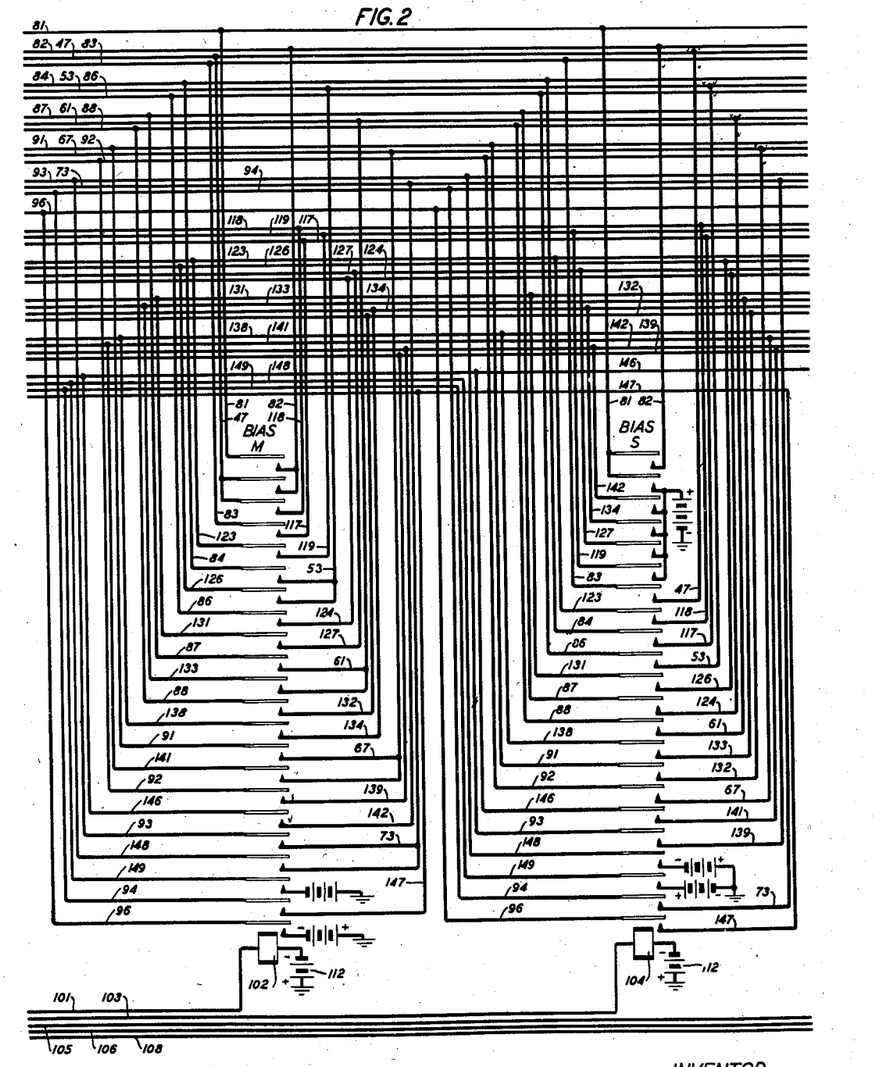
Figure 3:
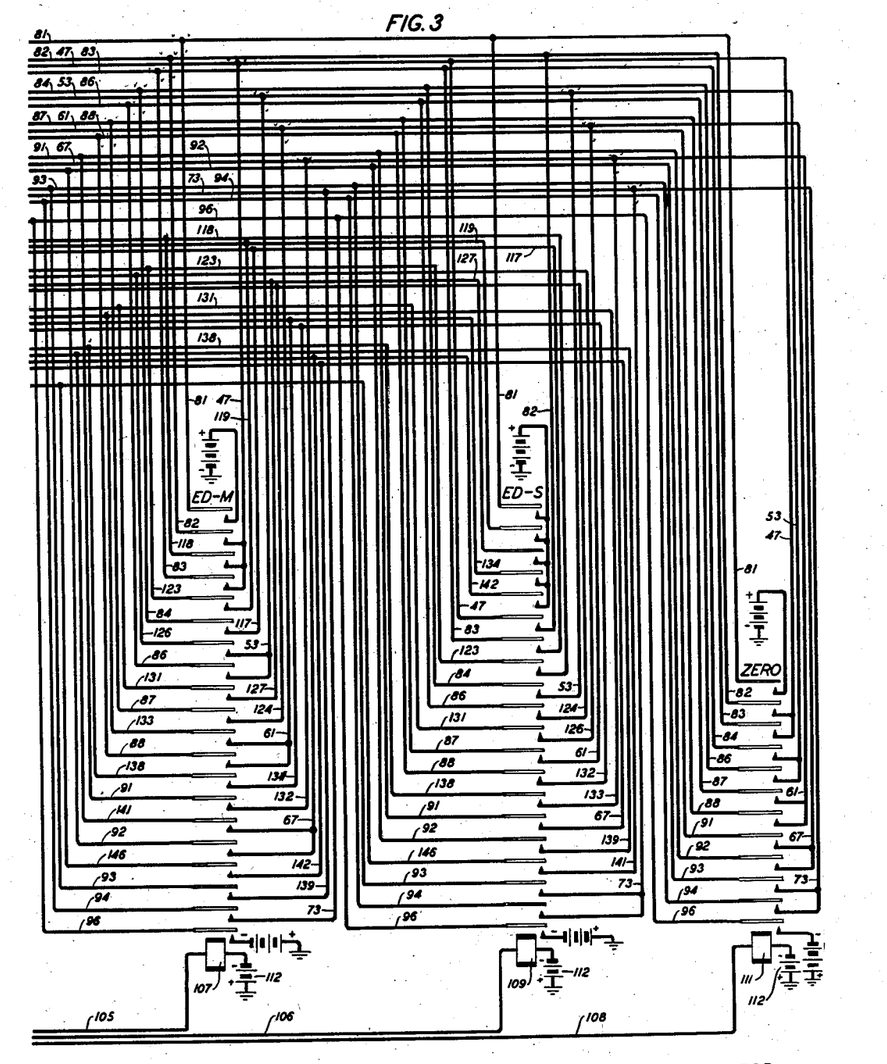

In addition to the conductors 47, 53, 61, 67 and 73 connected to the middle segment of each of the five code impulse groups of segments the distributor has the short segment of the "start" group connected to conductor 81, the first and third segments of group 1 connected to conductors 82 and 83 respectively, the first and third segments of group 2 connected to conductors 84 and 86, respectively, the first and third segments of group 3 connected to conductors 87 and 88 respectively, the first and third segments of group 4 connected to conductors 91 and 92, respectively, the first and third segments of group 5 connected to conductors 93 and 94, respectively, and the short segment of the "stop" group connected to conductor 96. For subjecting signals generated by the transmitting distributor under the control of tape sensing contacts 14 to the various types of distortion there are provided five relays designated by the reference numerals 102, 104, 107, 109 and 111 (Figs. 2 and 3). The relay 102 has a minimum of twenty-two armatures, the relay 104 has the same number of armatures as relay 102, relay 107 has a minimum of twenty armatures, relay 109 has the same number of armatures as relay 107 and relay 111 has a minimum of twelve armatures. Each of the armatures of the relays 102, 104, 107, 109 and 111 cooperates only with a front contact and the armatures and contacts are so connected to the segments of segmented distributor ring 33 and to extra armatures and contacts of the relays 36, 37, 38, 39 and 41, as will be fully developed hereinafter, as to subject the signals generated by the transmitting distributor to distortion.

The armatures of the relay 102 when brought into engagement with their front contacts subject the signals to marking bias which as previously described, is evidenced by a lengthening of marking impulses at the expense of the preceding spacing impulse. The armatures of relay 104 when engaging their front contacts subject the signals generated to spacing bias which is evidenced by shortening of marking impulses to the enhancement of the preceding spacing impulse. The armatures of relay 107 cooperate with their front contacts to subject the signals to marking end distortion which is evidenced by lengthening of marking impulses at the expense of the following spacing impulse. The armatures of the relay 109 cooperate with their front contacts to subject the signals generated to spacing end distortion which is evidenced by shortening of marking impulses to the enhancement of spacing impulses immediately following them. Finally, the armatures of relay 111 cooperate with their front contacts to cause the transmitting distributor to transmit substantially perfect or unbiased and undistorted signals.

The relays 102, 104, 107, 109 and 111 are connected to batteries 112 and by individual conductors 101, 103, 105, 106 and 108 respectively to one side of individual normally open manually operable locking keys 97, 98, 99, 113 and 114, respectively. The other side of each of the keys is connected to ground and upon the closure of any one of the keys its associated one of the relays 102, 104, 107, 109 and 111 will become energized, attract all of its armatures into engagement with their front contacts and remain energized until the associated key is reopened.

Referring again to the relays 36 to 41, inclusive, it will be noted that in addition to the armature 49 the relay 36 also has an armature 116 which is connected to conductor 117 and is operable between front and back contacts. The front contact is connected to conductor 118 and the back contact is connected to conductor 119. Relay 56 has armatures 121 and 122 connected to conductors 123 and 124, respectively. The back contact with which armature 121 cooperates is connected to spacing battery 57 and the front contact is connected to armature 56 and through conductor 54 to conductor 53. The front contact with which armature 122 cooperates is connected to conductor 126 and the back contact is connected to conductor 127. Similarly, relay 38 has armatures 128 and 129 connected to conductors 131 and 132, respectively. The back and front contacts with which armature 128 cooperates are connected to spacing battery 64 and armature 63, respectively, and the front and back contacts with which armature 129 cooperates are connected to conductors 133 and 134, respectively. Relay 39 has armatures 136 and 137 connected to conductors 138 and 139, respectively.

The back and front contacts with which armature 136 cooperates are connected to spacing battery 71 and to armature 69, respectively, and the front and back contacts with which armature 137 cooperates are connected to conductors 141 and 142, respectively. Relay 41 has armatures 143 and 144 connected to conductors 146 and 147, respectively. The back and front contacts with which armature 143 cooperates are connected to spacing battery 77 and to armature 76, respectively, and the front and back contacts with which armature 144 cooperates are connected to conductors 148 and 149, respectively.

The number of segments contained in the segmented ring 33 of the transmitting distributor exclusive of the principal or larger segments of the "start" and "stop" groups is seventeen and from those segments seventeen conductors previously identified extend somewhat in the manner of bus bars and have various connections to armatures and front contacts of the relays 102, 104, 107, 109 and 111. Exclusive of the armatures and contacts of the relays 36, 37, 38, 39 and 41 which supply battery connections directly to the middle segments of each of the code impulse groups of segments, as previously described, the relay 36 has one armature and a front and back contact, and each of the relays 37, 38, 39 and 41 has two armatures and one front and back contact from which extend conductors, previously identified, somewhat in the manner of bus bars having various connections to the armatures and front contacts of the relays 102, 104, 107, 109 and 111. With relay 36 having three elements and each of the relays 37, 38, 39 and 41 having four elements to which these conductors extend, there is a total of nineteen such conductors. Thus there is a total of thirty-six conductors having connections to the armatures and front contacts of the five manually controlled relays. The identity of the connections of each of the thirty-six conductors to the armatures and front contacts of the relays 102, 104, 107, 109 and 111 is shown in the chart or table following the next paragraph.

In the upper portion of column I of the chart the segments of the distributor are identified by group and number and in the lower part of column I the armature and contact elements of the five tape sensing contact controlled relays are arranged in groups and the relays are identified by the previously applied reference numerals. The armatures are also identified by their reference numerals and the front and back contacts pertain to the armature under which they are indented. At the bottom of column I the legends "Marking battery" and "Spacing battery" appear for the reason that certain of the front contacts of the relays 102, 104, 107, 109 and 111 are connected to battery and not to any of the thirty-six conductors. In column II, the reference numerals identifying the thirty-six conductors appear opposite the distributor segments or armatures and contacts to which the conductors are connected as previously set forth. Also the conductors additional to the thirty-six over which marking or spacing battery connections are supplied from armatures of relays 36, 37, 38, 39 and 41 to the middle segment of each of the code groups of segments are identified. In columns III and IV the numbers of the armatures and contacts of relay 102 which are connected to the thirty-six conductors or to battery are identified. The numbers of the armatures and contacts of relay 102 are the ordinals of those elements beginning with the uppermost or outer armature and contact and ending with the lowest or innermost armature and contact. Columns V and VI contain the numbers of the armatures and contacts of relay 104 that are connected to the several conductors or to battery. Columns VII and VIII contain the armature and contact connection information for relay 107. Columns IX and X contain the armature and contact connection information for relay 109. Finally, columns XI and XII contain the armature and contact connection information for relay 111.

complete signals. The simplest set of connections for affording the transmission of complete signals is provided by the armatures and front contacts of relay 111 and therefore the manner in which the armatures and front contacts of that relay cooperate with the relays 36, 37, 38, 39 and 41 will be described first.

*Undistorted signals*

As previously stated, the relay 111 when energized by the closure of key 114, establishes con-

| I Distributor | | II Conductor | Relay 102 | | Relay 104 | | Relay 107 | | Relay 109 | | Relay 111 | |
|---|---|---|---|---|---|---|---|---|---|---|---|---|
| | | | III Armature | IV Contact | V Armature | VI Contact | VII Armature | VIII Contact | IX Armature | X Contact | XI Armature | XII Contact |
| Group | Seg. | | | | | | | | | | | |
| Start | 2 | 81 | 1 | | 1-2 | | 1 | | 1 | | 1 | |
| 1 | 1 | 82 | | 1-2 | | 1 | 2 | | | 6 | 2 | |
| | 2 | 47 | 2-3 | | | 7 | | 2-3-4 | 6 | | | 2-3 |
| | 3 | 83 | 4 | | 7 | | 4 | | 7 | | 3 | |
| 2 | 1 | 84 | 6 | | 9 | | 6 | | 9 | | 4 | |
| | 2 | 53 | | 6-7 | | 10 | | 7-8 | | 9 | | 4-5 |
| | 3 | 86 | 8 | | 10 | | 8 | | 10 | | 5 | |
| 3 | 1 | 87 | 10 | | 12 | | 10 | | 12 | | 6 | |
| | 2 | 61 | | 10-11 | | 13 | | 11-12 | | 12 | | 6-7 |
| | 3 | 88 | 12 | | 13 | | 12 | | 13 | | 7 | |
| 4 | 1 | 91 | 14 | | 15 | | 14 | | 15 | | 8 | |
| | 2 | 67 | | 14-15 | | 16 | | 15-16 | | 15 | | 8-9 |
| | 3 | 92 | 16 | | 16 | | 16 | | 16 | | 9 | |
| 5 | 1 | 93 | 18 | | 18 | | 18 | | 18 | | 10 | |
| | 2 | 73 | | 18-19 | | 21 | | 19 | | 18-19 | | 10-11 |
| | 3 | 94 | 21 | | 21 | | 19 | | 19 | | 11 | |
| Stop | 1 | 96 | 22 | | 22 | | 20 | | 20 | | 12 | |
| Contact relays relay element | | | | | | | | | | | | |
| 36 | Arm. 49 | 48-47 | | | | | | | | | | |
| | Arm. 116 | 117 | | 4 | | 9 | | 6 | | 7 | | |
| | Front | 118 | | 3 | | 8 | | 3 | | 8 | | |
| | Back | 119 | | 5 | 6 | | | 5 | | 2 | | |
| 37 | Arm. 56 | 54-53 | | | | | | | | | | |
| | Arm. 121 | 123 | 5 | | 8 | | 5 | | 8 | | | |
| | Arm. 122 | 124 | | 8 | | 12 | | 10 | | 10 | | |
| | Front | 126 | 7 | | | 11 | 7 | | | 11 | | |
| | Back | 127 | | 9 | 5 | | | 9 | | 3 | | |
| 38 | Arm. 63 | 62-61 | | | | | | | | | | |
| | Arm. 128 | 131 | 9 | | 11 | | 9 | | 11 | | | |
| | Arm. 129 | 132 | | 12 | | 15 | | 14 | | 13 | | |
| | Front | 133 | 11 | | | 14 | 11 | | | 14 | | |
| | Back | 134 | | 13 | 4 | | | 13 | | 4 | | |
| 39 | Arm. 69 | 68-67 | | | | | | | | | | |
| | Arm. 136 | 138 | 13 | | 14 | | 13 | | 14 | | | |
| | Arm. 137 | 139 | | 16 | | 18 | | 18 | | 16 | | |
| | Front | 141 | 15 | | | 17 | 15 | | | 17 | | |
| | Back | 142 | | 17 | 3 | | | 17 | | 5 | | |
| 41 | Arm. 76 | 74-73 | | | | | | | | | | |
| | Arm. 143 | 146 | 17 | | 17 | | 17 | | 17 | | | |
| | Arm. 144 | 147 | | 21 | | 22 | | | | | | |
| | Front | 148 | 19 | | 19 | | | | | | | |
| | Back | 149 | 20 | | 20 | | | | | | | |
| Marking battery | | | | 20 & 22 | | 19 | | 20 | | 20 | | 12 |
| Spacing battery | | | | | 2, 3, 4, 5, 6, 20 | | | 1 | | 1, 2, 3, 4, 5 | | 1 |

When none of the relays 102, 104, 107, 109 and 111 is energized, only the larger segments of the "start" and "stop" groups of segments and the middle segment of each of the code groups of segments has battery connected thereto, whether any of the relays 36, 37, 38, 39 and 41 is energized or all are in the spacing condition. With this condition of the apparatus signaling impulses of proper length cannot be transmitted because battery connections are available for only portions of the start, stop and code impulses. Accordingly, it is necessary to have one of the relays 102, 104, 107, 109 and 111 energized in order to transmit nections for effecting the transmission of substantially perfect or undistorted signals. By reference to columns XI and XII of the chart it will be observed that the first armature of relay 111 is connected to conductor 81 which extends to the second segment of the "start" group and that the first contact of relay 111 is connected to spacing battery. Thus the second segment of the "start" group receives the same battery connection as the first or longer segment of that group and the entire group will have spacing potentials thereby providing a substantially perfect start signal.

The second and third contacts of relay 111 being connected together and to conductor 47, the second and third armatures by which the contacts are engaged will interconnect conductors 82 and 83 with the conductor 47 which receives marking or spacing battery from armature 49 of relay 36 depending upon whether that relay is in marking or spacing condition. The conductors 82, 47 and 83 extend to the three segments of the code impulse group 1, and accordingly that group will be in marking or spacing condition depending upon the condition of relay 36. Similarly, the fourth and fifth armatures and contacts of relay 111 interconnect conductors 84, 53 and 86 which extend to the three segments of the code group 2, and since conductor 53 receives marking or spacing battery connection depending upon the marking or spacing condition of the relay 37 under the control of its tape sensing contacts, the three segments comprising code impulse group 2 will receive marking or spacing battery. In the same way the segments of code impulse group 3, of code impulse group 4 and of code impulse group 5 will be bridged together to establish uniform signaling conditions throughout the arcs occupied by those groups under the control of the relays 38, 39 and 41.

The last or twelfth armature of relay 111 is connected to conductor 96 which extends to the first segment of the "stop" group and the twelfth contact of the relay is connected to marking battery. This battery is of the same polarity as that applied to the longer segment of the "stop" group and, accordingly, the "stop" group will have marking condition applied thereto throughout its entire arcuate extent. The transmission of signaling current by potentials applied to all parts of the segmented ring 33 under the control of relays 36, 37, 38, 39 and 41 through connections established by the armatures and front contacts of relay 111 is thus accomplished.

Signals with marking bias

Assume now that key 114 through which the relay 111 was energized is opened and key 97 is closed to effect the energization of relay 102 for the transmission of signals subjected to marking bias. The relay 102 will attract its twenty-two armatures into engagement with the twenty-two front contacts. Reference should now be had to columns III and IV of the chart for the connections which the armatures and front contacts of relay 102 establish. Since the first and second contacts of relay 102 are connected together and the second and third armatures are connected together, the first, second and third armatures and contacts will become electrically interconnected and will interconnect the conductors 81, 82, 47 and 118. Since conductor 118 becomes connected to conductor 117 through armature 116 of relay 36 when the relay is energized, it is necessary to assume a particular condition for the relay 36 and it will be assumed for the present that the relay 36 is in the deenergized or spacing condition. With this condition the conductor 118 terminates at the dead front contact of relay 36. Accordingly it may be disregarded and only the conductors 81, 82 and 47 considered. With relay 36 in the spacing condition, spacing battery is connected to conductor 47 over conductor 48 and, accordingly, spacing battery will be connected to conductors 81, 82 and 47 which extend to the second segment in the "start" group and to the first and second segments in code impulse group 1. This places the entire "start" group and the first two-thirds of code group 1 in spacing condition.

The third segment in code group 1 is connected to the fourth armature of relay 102 over conductor 83 and to this conductor is connected conductor 117 at the fourth front contact of armature 102, conductor 119 through armature 116 of relay 36 and its back contact and through conductor 119, the fifth front contact and armature of relay 102 to conductor 123 which extends to armature 121 of relay 37. From this it becomes apparent that the third segment in code group 1 does not receive a signaling potential under the control of relay 36 as it did when relay 111 was operated but instead receives a signaling potential under the control of relay 37. If relay 37 is in spacing condition the potential applied to the third segment of code impulse group 1 will be spacing but if relay 37 is in marking condition the potential applied to the third segment of code group 1 will be marking. The beginning of a second code impulse of the code combination if it is of marking nature thus is advanced and encroaches on the first code impulse of the signal combination when that impulse is spacing.

Assuming now that the first code impulse of the signal combination is marking and therefore that relay 36 is energized, the conductors 81, 82 and 47 will be interconnected by the first three armatures and front contact of relay 102 as previously described and, in addition, the conductor 118 extending from the third contact of relay 102 to the front contact of relay 36, the conductor 117 extending from the armature 116 to the fourth contact of relay 102 and conductor 83 extending from the fourth contact of relay 102 to the third segment of code impulse group 1 will be connected to the conductors 81, 82 and 47. Since conductor 47 now receives marking battery through the armature 49 of relay 36 and through conductor 48, the second segment of the "start" group and the three segments of code group 1 will have marking polarity. It is thus noted that with relay 36 in marking condition, the third segment of code group 1 is under the control of that relay and is in marking condition and also the second segment of the "start" group of segments is marking so that the first impulse of the code combination, being of marking nature, has encroached upon the start signal and has reduced the length of that signal. This coincides with the previously stated definition of a marking bias condition which is a lengthening of marking signals at the expense of a preceding spacing signal.

With relay 37 in spacing condition, conductors 84, 53 and 126 are interconnected by the sixth and seventh armatures and contacts of relay 102, as shown in columns III and IV of the chart, to connect the spacing battery applied to conductor 53 through armature 56 of relay 37 and conductor 54 to the first and second segments of code group 2. As previously stated, armature 121 will apply spacing battery through conductor 123, the fifth armature and front contact of relay 102, conductor 119, back contact and armature 116 of relay 36, conductor 117, fourth contact and armature of relay 102 and conductor 83 to the third segment of code group 1 if relay 36 is in spacing condition, but will have no effect on the segments in code group 1 if relay 36 is in marking condition. Conductors 86, 124, 127 and 131 will be interconnected to apply that battery polarity to the third segment of group 2 which armature 128 of relay 38 receives so that if relay 38 is in marking condition, the third segment of code group 2 will be marking, thus encroaching upon the spacing signal generated at code group 2 whereas if relay 38 is in spacing condition its armature 128 will be engaging spacing battery and the third segment of code group 2 will be at spacing polarity thus providing a full spacing impulse at the three segments of code group 2. If relay 37 is in marking condition conductors 84, 53, 126, 124 and 86 will be at the polarity of conductor 53 which is marking and also marking battery will be applied from armature 121 of relay 37 to conductors 123, 119, 117 if relay 36 is in spacing condition, and conductor 83 so that all of the segments of code group 2 will be at marking polarity and, in addition, the third segment of code group 1 will be at marking polarity, the latter condition having been previously described. From this it will be apparent that a marking second impulse of the code combination will encroach upon a spacing first impulse and will extend over the entire arc of code group 2. It is to be noted that the third segment of code group 1 is at marking polarity when either or both of the relays 36 and 37 is in marking condition and similarly that the third segment of code group 2 is at marking polarity when either or both of the relays 37 and 38 is in marking condition.

In a similar manner the relay 39, when in marking condition, establishes a marking signal which encroaches on a spacing signal generated under the control of relay 38 and that a marking signal generated under the control of the relay 41 encroaches on a spacing signal generated under the control of the relay 39.

The fact that similar control of the segments in code groups 2, 3 and 4 is effected by the relays 37, 38 and 39 with the cooperation of armatures and front contacts of relay 102 is evidenced by the similarity of the patterns of connections between the relay elements and armatures and contacts of the relay 102 in columns III and IV of the chart. The pattern of connections to relay 36 is shown by the chart to be different from those of the relay 37, 38 and 39 because of the fact that when the relay 36 is in marking condition it causes the second segment of the "start" group to be at marking polarity whereas when the relay 36 is in spacing condition the second segment of the "start" group is at spacing polarity. It will also be noted that the pattern of connections for the relay 41 is different from the patterns of relays 37, 38 and 39. The reason for this is that the stop signal which immediately follows the fifth code signal is of marking nature and in transmitting signals subjected to marking bias the stop impulse must encroach on the fifth code impulse when that impulse is spacing so that the third segment of code group 5 must be marking whether the fifth impulse is marking or spacing. By means of the eighteenth and nineteenth armatures and front contacts of relay 102, conductors 93, 73 and 148 are interconnected and since the conductor 73 is at spacing polarity when relay 41 is deenergized and is at marking polarity when relay 41 is energized, the first and second segments of code group 5 will be at spacing polarity when relay 41 is deenergized and the front contact with which armature 144 cooperates will also be at spacing polarity but will not be engaged by its armature. With regard to the third segment of code group 5, conductor 94 which is connected to the twenty-first armature of relay 102, will be connected to conductor 147 and through armature 144 of relay 41 and its back contact to conductor 149 which extends to the twentieth armature of relay 102 which receives marking battery through the twentieth contact. Thus the third segment of code group 5 will be at marking polarity to represent the marking bias created by the stop signal. With relay 41 energized segments 1 and 2 of code group 5 will receive marking polarity from conductors 93 and 73 and conductors 148, 147 and 94 will be connected to conductor 73 to provide marking polarity for the third segment. From this it will be observed that when relay 41 is energized, the third segment of code group 5 is placed at marking polarity not by the battery connected to the twentieth front contact of relay 102 but from battery 78. As in the case of the relays 36, 37, 38 and 39, when relay 41 is in marking condition, the third segment of code group 4 is placed at marking polarity by armature 143 of relay 144 through conductor 146, seventeenth armature and front contact of relay 102 and conductor 142 if relay 39 is then deenergized. The first segment of the stop signal group is placed at marking potential by the marking battery connected to the twenty-second contact of relay 102 through the twenty-second armature of that relay and conductor 96 as clearly shown by columns III and IV of the chart.

*Spacing bias*

Upon the closure of key 98 with none of the keys 97, 99, 113 and 114 closed, the relay 104 will be energized to attract its twenty-two armatures into engagement with the twenty-two front contacts. This relay establishes connections to subject signals generated by the distributor to spacing bias which is a condition evidenced by lengthening of spacing impulses at the expense of following marking impulses. The connections through the armatures and front contacts of relay 104 are indicated in columns V and VI of the chart. With relay 104 energized, conductors 81 and 82 are connected together to connect the second segment of the "Start" group to the first segment of code group 1 and these elements are connected to spacing battery at the second front contact of relay 104 so that all of the "Start" group is at spacing polarity which is the true spacing condition, and the first segment of code group 1 will also be at spacing polarity independently of the relay 36 because the spacing battery connection at the second front contact of relay 104 is directly applied to the first segment of code group 1. This indicates that the spacing conditions of the start impulse encroaches on the first code impulse when that impulse is marking since the polarity applied to the first segment of code group 1 of segments is not affected by the condition of relay 36. At the seventh armature and front contact of relay 104 conductors 47 and 83 are interconnected so that the second and third segments of code group 1 will be at spacing polarity with spacing battery applied to conductor 47 by battery 51 if relay 36 is deenergized and marking polarity will be applied to conductor 47 by battery 52 if relay 36 is energized.

With the arrangement of connections for the segments of code group 1 as shown in columns V and VI of the chart, the first segment of the code group is permanently connected to spacing battery. The reason for this is that the relay 104 establishes a spacing bias condition on the signals, which is characterized by a shortened marking impulse when the first impulse of the code is marking and a corresponding lengthening of the start impulse. Of the three conductors 82, 47 and 83 extending to the three segments of code group 1 only the conductors 47 and 83 are connected together through the relay 104. The reason for this is that when the first impulse of the code combination is of marking nature and relay 36 is energized, the marking impulse will only be of two segments duration.

With relay 36 deenergized, conductors 117 and 119 connected to armature 116 of relay 36 and back contact, and conductor 84 extending to the first segment of the second code group, will be connected together and to spacing battery at the sixth front contact of relay 104. The reason for this is that if the first code impulse is spacing, it exercises a spacing bias effect to reduce the length of the second code impulse if that impulse is of marking nature represented by energized condition of relay 37.

When relay is energized, conductors 117 and 118 connected to the armature 116 of relay 36 and front contact are connected to conductor 123 extending to armature 121 of relay 37 and to conductor 84 extending to the first segment of code group 2 through the eighth and ninth armature and front contact of relay 104. It will be remembered that armature 121 of relay 37 is at spacing polarity if relay 37 is deenergized and is at marking polarity if relay 37 is energized. The interpretation of these connections is that the first segment of code group 2 should be at spacing polarity if relay 37 is deenergized and should be at marking polarity if relay 37 is energized due to the fact that when the first impulse is of marking nature, no spacing bias effect is exerted upon the beginning of the second impulse and accordingly, the first segment of code group 2 should be at marking polarity.

With relay 104 energized conductors 53 and 86 are connected together through the tenth armature and front contact of the relay, so that the second and third segments of code group 2 will be at spacing polarity if relay 37 is deenergized and will be at marking polarity if relay 37 is energized. Similar circuit connections are established as between the relays 37 and 38, and as between the relays 38 and 39, that were established between relays 36 and 37, so as to shorten any marking impulse that is preceded by a spacing impulse, such spacing impulse being correspondingly lengthened. The connections to the relay 41 with respect to the three segments of code group 5 are similar to the connections to the relay 39 in that armatures 17 and 18 of relay 104 provide for the application of marking polarity to the first segment of code group 5 if relay 39 is in marking condition and relay 41 is in marking condition or alternatively provide that the first segment of code group 5 shall be at spacing polarity if the relay 39 is in spacing condition regardless of whether relay 41 is in the spacing or marking condition. The twenty-first armature and contact of relay 104 establish a connection between conductors 73 and 94 so that the second and third segments of code group 5 will be at spacing potential if relay 41 is deenergized and shall be at marking polarity if relay 41 is energized.

Since as previously stated spacing bias delays the beginning of the stop impulse if the fifth code impulse is of spacing nature, it is to be expected that the relay 41 will exercise a supervisory control over the application of a signaling polarity to the first segment of the stop group in the same manner that the relays 36, 37, 38 and 39 effect a supervisory control over the first segment of the code groups 2, 3, 4 and 5, respectively. Accordingly, it will be noted in the chart that the first segment of the stop group is connected to the twenty-second armature of relay 104 and that the twenty-second front contact is connected to the armature 144 of relay 41. When relay 41 is deenergized, representing a spacing condition, the armature 144 engages its back contact which is connected through the twentieth armature and front contact of relay 104 to spacing battery. This condition will subject the stop signal to a spacing bias. When relay 41 is energized, its armature 144 engages the front contact which is connected through the nineteenth armature and front contact of relay 104 to marking battery. Thus when the fifth code impulse is marking the stop signal group of segments will be at marking polarity throughout their entire extent.

*Marking end distortion*

In order to subject signals to be transmitted to marking end distortion, the key 98 is opened and the key 99 is closed thereby releasing the relay 104 and completing the energizing circuit for the relay 107 which attracts its twenty armatures into engagement with the twenty front contacts. The connections through the armatures and front contacts of relay 107 are shown in columns VII and VIII of the chart. It should be remembered that marking end distortion is characterized by a delaying of the ends of code impulses of marking nature so that those impulses are lengthened at the expense of spacing impulses immediately following them and that neither the start signal nor the stop signal is in any way affected by marking end distortion. Accordingly it is noted that the second segment of the start group is connected through the first armature and front contact of relay 107 to spacing battery so that that segment is always at spacing polarity.

The conductors 82, 47 and 83 extending to the three segments of the first code group are connected together through the second and fourth armatures of relay 107 and the second, third and fourth front contacts which are connected together. Thus when relay 36 is deenergized, the three code segments will receive spacing battery through conductor 47 and when relay 36 is energized, the three segments will receive marking battery through conductor 47. The third armature of relay 107 is connected to the front contact of relay 36 with which armature 116 cooperates so that when relay 36 is energized, conductors 118 and 117 will be connected to the conductors 82, 47 and 83 and through the sixth front contact and armature of relay 107, there will be added to this group of conductors the conductor 84 which extends to the first segment of code group 2. Thus when relay 36 is in marking condition, the marking polarity impressed upon the three segments of code group 1 will be extended to include the first segment of code group 2, thereby establishing the marking end distortion condition. When relay 36 is deenergized, the first segment of code group 2 should be at spacing polarity unless relay 37 is energized to establish the second code impulse as a marking condition. Accordingly the back contact with which armature 116 of relay 36 cooperates is connected to the fifth front contact of relay 104 and through the fifth armature of that relay to armature 121 of relay 37. Thus the armature 121 of relay 37 is connected through conductors 123 and 119 and when relay 36 is deenergized, through the additional conductors 117 and 84 to the first segment of code group 2. With relay 36 deenergized the first segment of code group 2 will receive spacing polarity from armature 121 of relay 37 when the relay is deenergized and will receive marking polarity from that armature when the relay is energized. When relay 36 is energized, the armature 121 of relay 37 is disconnected from the first segment of code group 2 at the armature 116 of relay 36 so that the first segment of code group 2 will be at marking potential regardless of the condition of relay 37.

In the preceding paragraph the application of different polarities to the first segment of code group 2 was described. The second and third segments of that group are connected together through conductors 53 and 86 through the eighth armature and front contact of relay 107 and in view of the fact that conductor 53 directly receives spacing or marking polarity according to the condition of relay 37, the polarity of the third segment of code group 2 will be similarly controlled directly. The seventh front contact of relay 107 is connected to the eighth front contact so that there is connected to the conductors 53 and 86, the conductor 126 through the seventh armature of relay 107. Conductor 126 is connected to the front contact with which armature 122 of relay 37 cooperates and the armature is connected through the tenth front contact and armature of relay 107 to the first segment of code group 3. Thus when relay 37 is in marking condition, this condition will be extended to the first segment of the code group 3 similarly to the control of the first segment of code group 2 by the relay 36, which is the marking end distortion characteristic. With relay 37 deenergized, the first segment of code group 3 is placed under the control of armature 128 of relay 38 through conductors 87, 124, 127 and 131 so that the segment will be at spacing polarity if relay 38 is in spacing condition and will be at marking polarity if relay 38 is in marking condition.

Connections similar to those described are provided at the relays 38 and 39 through armatures and front contacts of the relay 107, but different connections are established at the relay 41. The reason for this is that the relay 41 has no supervisory control over the segments of the "stop" group since marking end distortion does not effect the stop signal. Accordingly, there are no connections from the armature 144 and front and back contacts of relay 41 to armatures or front contacts in the relay 107. The nineteenth armature and front contact of the relay 107 interconnects conductors 73 and 94 so that the second and third segments of code group 5 will be at spacing or marking polarity depending upon the condition of relay 41, and through the seventeenth armature and front contact of relay 107, the armature 143 of relay 41 determines the signaling polarity applied to the first segment of code group 5 if relay 39 is deenergized. The first segment of the stop impulse group invariably receives marking battery connection through the twentieth armature and front contact of relay 107 whereby the stop impulse group is maintained at marking polarity throughout its entirety.

*Spacing end distortion*

In order to subject signals to spacing end distortion, key 113 is closed to complete the energizing circuit for the relay 109 and the keys 97, 98, 99 and 114 are placed in open condition. This establishes connections through the twenty armatures and front contacts of relay 109 for subjecting the signals to spacing end distortion. It should be remembered that this type of distortion is characterized by advancement of the end of any marking selecting impulse relative to the beginning of the start impulse, resulting in shortening of the impulse and corresponding lengthening of a following spacing impulse. As is to be expected under these circumstances the second segment of the "start" group is connected through the first armature and front contact of relay 109 to spacing battery so that that segment is invariably at spacing polarity.

Whereas in the case of the marking end distortion, the second and third segments of each code group were connected together and directly received marking or spacing polarity in accordance with the condition of their associated relays, in the case of spacing end distortion, the first and second segments of each code group are connected together to receive marking or spacing polarity directly. This is indicated in columns IX and X of the chart by the fact that with reference to code group 1, the conductor 82 is connected to the sixth front contact of relay 109 and conductor 47 is connected to the sixth armature of that relay. When relay 36 is deenergized, all three of the segments of code group 1 should be at spacing polarity. It is clearly apparent from the chart that this is the case since conductors 82 and 47 are connected together and conductor 83 is connected through the seventh front contact and armature of relay 109 to conductor 117 associated with armature 116 of relay 36. The armature 116 at this time engages its back contact which is connected through conductor 119 and the second armature and front contact of relay 109 to spacing battery. When the relay 36 is energized to establish a marking condition, the first and second segments of code group 1 will receive marking polarity through conductors 82 and 47 interconnected at the sixth armature and front contact of relay 109, but the polarity applied to the third segment of code group 1 will depend upon the condition of relay 37 since the third segment should be at spacing polarity if the second impulse of the code is spacing, according to the definition of spacing and distortion and should be at marking potential if the second impulse of the code is marking.

Assuming first that relay 36 is energized and relay 37 is deenergized, conductor 83 will be connected through conductors 117, 118 and 123 to armature 121 of relay 37. Armature 121 of relay 37 is at spacing polarity when relay 37 is deenergized and accordingly the third segment of code group 1 will be at spacing polarity. Assuming now that relay 37 is energized, armature 121 is at marking polarity, and under those circumstances the third segment of code group 1 will be at marking polarity.

In a similar manner the relays 37, 38 and 39 determine whether the second, third and fourth impulses of the code shall be marking or spacing and each determines whether the third portion of the preceding impulse shall be marking or spacing. The relay 41 determines whether the third segment of code group 4 shall be at marking or spacing polarity and in addition exercises sole control over the three segments of code group 5. The reason for this is that the stop impulse which immediately follows the fifth code impulse is of marking nature and accordingly is not of the proper polarity to subject a fifth marking impulse in the code to spacing end distortion. The fact that relay 41 solely controls the three segments of code group 5 is indicated in columns IX and X of the chart by the fact that conductor 73 is connected to front contacts 18 and 19 of relay 109 and that conductors 93 and 94 are connected to armatures 18 and 19, respectively, so that conductors 93 and 94 and therefore segments 1 and 3 will be at whatever polarity is applied by conductor 73 to the second segment.

The connection to the first segment of the "stop" group established by relay 109 is the same as that established by relay 107, namely, a marking battery connection through the twentieth armature and front contact of relay 109. With this connection, the segments of the "stop" group are invariably at marking polarity.

It will be understood that the invention is not limited to the use of relays for establishing the connections necessary to achieve marking bias, spacing bias, marking end distortion, spacing end distortion and zero distortion conditions. It is within the contemplation of the invention that manually operable multicontact locking switches could be substituted for the relays 102, 104, 107, 109 and 111.

It will be noted that with a transmitting distributor as shown in Fig. 1 and described herein, provision is made for subjecting signals to fixed bias or end distortion amounting to substantially 33⅓ per cent of an impulse length, since each code group consists of three equal segments. The invention is not intended to be limited to that percentage of bias or distortion nor to any fixed percentage of bias or distortion. By shortening or lengthening the first and third segments of each code group and correspondingly lengthening or shortening the second segment of each code group, different fixed amounts of bias and end distortion could be attained. Variable bias or distortion in fixed steps could be achieved by providing as each code group a plurality of equal length small segments throughout the group or a plurality of equal length small segments at the beginning and end of the group and a large segment centrally of the group, with switching means for connecting all except the end segments of each group together or for connecting two or more segments at each end of the group together and the remaining segments together to serve as the middle segments. Variable bias and distortion of any desired percentage could also be achieved by the well-known practice of providing two segmented rings, the position of one being variable with respect to that of the other.

Although a specific embodiment of the invention has been disclosed in the drawings and described in the foregoing specification, it will be understood that the invention is not limited to such specific embodiment but is capable of modification and rearrangement without departing from the spirit of the invention and within the scope of the appended claims.

What is claimed is:

1. In a telegraph transmitter, a set of signaling contacts, a set of relays controlled by said contacts, a transmitting distributor having a continuous conductive ring and a segmented conductive ring, said segmented ring having a plurality of segments forming each signaling impulse arc of said ring, and selectively operable switching means for applying to said segments under the control of said relays positive and negative potentials to represent polar signals having various types of distortion.

2. In a telegraph transmitter, a set of signaling contacts, a set of relays controlled by said contacts, a transmitting distributor having a continuous conductive ring and a segmented conductive ring, said segmented ring having an equal number of segments forming each code impulse arc of said ring, and selectively operable switching means for applying to said segments under the control of said relays positive and negative potentials to represents polar signals having various types of distortion.

3. In a telegraph transmitter, a rotary distributor having a continuous conductive ring and a segmented conductive ring, said segmented ring having a plurality of segments forming each signaling impulse arc of said ring, a set of signaling contacts, a set of relays controlled by said signaling contacts for generally applying signaling potentials of either of two polarities to the segments in each of said code impulse arcs, and selectively controlled switching means for modifying the potentials generally impressed on said segments under the control of said relays by reversing the polarity impressed upon certain of said segments for simulating distorted signals.

4. In a telegraph transmitter, a rotary transmitting distributor having a continuous conductive ring and a segmented conductive ring, said segmented ring having a plurality of segments forming each signaling impulse arc of said ring, a set of signaling contacts, a set of relays controlled by said contacts for generally impressing on the segments of each arc signaling potentials of either of two polarities, and selectively operable switching means for effecting variation in the effective length of the signaling impulse arcs by reversing the polarities impressed on certain of said segments under the control of said relays for simulating various types of distortion in the telegraph signals generated by said rotary transmitter.

5. In a telegraph transmitter, a rotary distributor having a continuous conductive ring and a segmented conductive ring, said segmented ring having a plurality of segments forming each signaling impulse arc of said ring, a set of signaling contacts, a set of relays controlled by said contacts for controlling exclusively the application of positive or negative potentials to at least one segment of each of said arcs of segments, switching means for controlling jointly with said relays the application of positive or negative potentials to the other segments of each arc of segments, and manually operable means for controlling said switching means.

6. In a telegraph transmitter, a rotary distributor having a continuous conductive ring and a segmented conductive ring, said segmented ring having a plurality of segments forming each signaling impulse arc of said ring, a set of signaling contacts, a set of relays controlled by said contacts for generally impressing on the segments of each arc signaling potentials of either of two polarities, and selectively operable switching means for changing the polarity of potentials impressed on said segments under the control of said relays for electrically increasing and alternatively decreasing the effective length of certain of said signaling impulse arcs.

7. In a telegraph transmitter, a set of signaling contacts, a set of relays controlled by said contacts, a transmitting distributor having one continuous conductive ring and one segmented conductive ring, an electrical conductor connected to each of the segments of said segmented ring, means controlled by said relays for connecting signaling potentials directly to certain of said conductors whereby to apply said signaling potentials directly to the segments associated with said certain conductors, and a plurality of selectively operable switching devices for variously interconnecting each of said certain conductors with others of said conductors for conditioning said distributor to generate alternatively various distorted signals and undistorted signals.

8. In a telegraph transmitter, a set of signaling contacts, a set of relays controlled by said contacts, a transmitting distributor having a continuous conductive ring and a segmented conductive ring, an electrical conductor connected to each of the segments of said segmented ring, means controlled by said relays for selectively impressing on certain of said conductors signaling potentials of either of two polarities whereby to impress said potentials directly upon the segments associated with said certain conductors, switching means controlled by certain of said relays, and a plurality of selectively operable switching devices for directly connecting each of said certain conductors to others of said conductors and alternatively for indirectly connecting each of said certain conductors to others of said conductors through the switching means associated with said relays for subjecting signals generated by said distributor to various types of distortion.

9. In a telegraph transmitter, a set of signaling contacts, a set of relays controlled by said contacts, a transmitting distributor having a continuous conductive ring and a segmented conductive ring, sources of signaling potential connected to certain of the segments of said segmented ring, electrical conductors connected to the remainder of the segments of said segmented ring, means controlled by said relays for impressing signaling potentials of either of two polarities directly on certain of said conductors whereby to impress said potentials directly on the segments associated with said certain conductors, and a plurality of selectively operable switching devices for variously connecting each of said certain conductors to others of said conductors and for connecting sources of signaling potential to still others of said conductors whereby to subject signals generated by said distributor to various types of distortion.

10. In a telegraph transmitter, a rotary distributor having a continuous conductive ring and a segmented conductive ring, a set of signaling contacts, a set of relays controlled by said contacts, means controlled by said relays for directly impressing on certain of the segments of said segmented ring signaling potentials of either of two polarities, and selectively operable switching devices for connecting variable numbers of the other segments of said segmented ring to said certain segments whereby the segments so connected receive the same polarity as said certain segments.

11. In a telegraph transmitter, a rotary distributor having a continuous conductive ring and a segmented conductive ring, said segmented ring having at least two segments comprising the start impulse arc, at least two segments comprising the stop impulse arc and a plurality of segments comprising each code impulse arc, a set of signaling contacts, a set of relays controlled by said contacts for impressing potentials of either of two polarities directly upon one segment of each of said code impulse arcs of segments, and selectively operable switching means for causing the polarities impressed upon other segments in said code impulse arc to be determined by the polarity of signals generated by preceding or succeeding arcs of segments.

WILMARTH Y. LANG.